(12) United States Patent
Zhao (10) Patent No.: US 11,415,129 B2
(45) Date of Patent: Aug. 16, 2022

(54) HIGH-PRESSURE PUMP (71) Applicant: Globe (Jiangsu) Co., Ltd., Jiangsu (CN)

(72) Inventor: Chunlin Zhao, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 142 days.

(21) Appl. No.: 16/794,772

(22) Filed: Feb. 19, 2020

(65) Prior Publication Data
US 2020/0263689 A1 Aug. 20, 2020

(30) Foreign Application Priority Data

Feb. 19, 2019 (CN) .......................... 201910121604.4

(51) Int. Cl.
*F04C 15/00* (2006.01)
*H02K 9/19* (2006.01)
*H02K 7/14* (2006.01)

(52) U.S. Cl.
CPC ........... *F04C 15/0096* (2013.01); *H02K 9/19* (2013.01); *F04C 2210/208* (2013.01); *F04C 2240/30* (2013.01); *F04C 2240/40* (2013.01)

(58) Field of Classification Search
CPC ............ F04C 15/0096; F04C 2210/208; F04C 2240/30; F04C 2240/40; H02K 9/19
USPC ........................................................ 417/366
See application file for complete search history.

(56) References Cited

U.S. PATENT DOCUMENTS

| | | | | |
|---|---|---|---|---|
| 4,480,967 A * | 11/1984 | Schulze | ..................... | B08B 3/00 417/368 |
| 4,913,628 A * | 4/1990 | Samland | ................. | F04B 53/08 417/273 |
| 6,744,158 B2 * | 6/2004 | Liang | ....................... | H02K 9/22 310/64 |
| 8,506,264 B2 * | 8/2013 | Horng | ...................... | H02K 9/22 417/410.1 |
| 10,047,767 B2 | 8/2018 | Dirnberger et al. | | |
| 2010/0047091 A1 | 2/2010 | Schiffhauer et al. | | |
| 2012/0195772 A1 | 8/2012 | Schiffhauer et al. | | |
| 2013/0263899 A1 * | 10/2013 | Dirnberger | .............. | F04B 53/16 134/184 |
| 2014/0154112 A1 | 6/2014 | Nathan et al. | | |
| 2018/0138839 A1 * | 5/2018 | Puzio | ..................... | H02K 11/33 |

\* cited by examiner

*Primary Examiner* — Connor J Tremarche
(74) *Attorney, Agent, or Firm* — Rooney IP, LLC (57) ABSTRACT

The present invention provides a high-pressure pump. The high-pressure pump comprises a motor assembly, a gear assembly, a plunger assembly, a pump head assembly and a water inlet and outlet valve assembly. The motor assembly comprises a motor and a dual-layer housing. An annular water channel surrounding a motor stator is formed at the dual-layer housing. The periphery of the motor stator coil is filled with heat-conductive material, and the heat of the motor stator coil is conducted to the annular water channel through the heat-conductive material to perform active heat dissipation for the motor stator coil. Therefore, the cooling efficiency is high and the structure is simple.

5 Claims, 8 Drawing Sheets

ID PUMP

CROSS-REFERENCE TO RELATED APPLICATIONS

This application is a US application which claims the priority of CN Application Serial No. 201910121604.4, filed on Feb. 19, 2019, the disclosure of which is hereby incorporated by reference in its entirety.

TECHNICAL FIELD

The present invention relates to a high-pressure pump, and more particularly to a high-pressure pump having a good cooling effect.

BACKGROUND ART

At present, there are mainly two ways for the high-pressure pump to dissipate heat on the market. One way is to use a fan to dissipate heat from the motor, and the other one is to use a water-cooled passage to cool the silicon steel sheet of the motor. The heat dissipation efficiency of the fan cooling is low, and a ventilation slot needs to be set on the machine. During the use, the water can easily go into the ventilation slot, and it can affect the operation and safety of the internal electrical components of the machine. In addition, the two types of heat dissipation can't cool the motor coil (i.e., the main heating parts) of the motor pump effectively. The motor coil can only rely on the heat convection and the heat radiation to dissipate heat, which results in a low heat dissipation efficiency of the motor pump and an higher temperature of operation. The poor heat dissipation can cause the enameled wire of the coil to be easily deteriorated and the motor to run unstably.

Therefore, there is a necessity to provide a new type of high-pressure pump to solve the mentioned problems.

SUMMARY OF INVENTION

The object of the present invention is to provide a high-pressure pump which has a high cooling efficiency and a simple structure.

For achieving the above object, the present invention provides a high-pressure pump, which includes a motor assembly, a gear assembly, a plunger assembly, a pump head assembly, and an inlet and outlet valve assembly. The motor assembly includes a motor and a double-layer housing, the double-layer housing forming an annular water channel surrounding the motor stator. The periphery of the motor stator coil is filled with heat-conductive material which is used to conduct the heat of the stator coil of the motor to the annular water channel.

Further, said heat-conductive material is annular shape and is disposed between the stator coils exposed at both ends of the stator shaft along the axial direction of the motor.

Further, the length of said annular water channel is substantially equivalent to that of the side surface of the motor stator and said heat-conductive material is distributed in a region corresponding to both end faces of the motor stator. Said annular water channel and heat-conductive material together form a heat dissipation area corresponding to the outer surface of the motor stator.

Further, said housing is provided with a first water channel and a second water channel which communicate with the annular water channel and extend in the axial direction of the high-pressure pump. Said first water channel and said second water channel extend to the side wall of the gear assembly.

Further, the first water channel and the second water channel are both straight-through type and respectively located at a top and bottom of the double-layer housing, and the first water channel and the second water channel respectively communicate with the two inlet check valves at both ends the plunger assembly. The water passages of the two inlet check valves are parallel to the first water channel and the second water channel and further communicate with the plunger chamber, the plunger chamber is respectively vertical with the first water channel and the second water channel.

Further, the tail end of the motor assembly is provided with a water inlet in an intermediate portion of the double-layer housing, and the annular water channel is connected to the water inlet.

Further, the water passage from the water inlet to the plunger chamber is directly-connected type.

Further, the heat-conductive material is a heat-dissipating silica gel which is filled into the motor stator coil by means of potting.

Further, said motor assembly provides a rotational speed and torque of the motor shaft, the speed is decelerated by the gear assembly. The eccentric shaft is rotated to push the plunger to reciprocate. The plunger chambers at both ends of the plunger alternately absorb water and drain to create a high pressure within the pump head assembly.

Further, said motor is a DC brushless motor driven by a lithium battery.

The invention has the beneficial effects that the heat-conductive material is filled around the stator coil of the motor, and the heat of the stator coil of the motor is transmitted to the annular water channel through the heat-conductive material. When the motor is working, the heat of the stator coil of the motor is directly transmitted to the water cooling channel through the heat-conductive material through thermal conduction. The method of active heat dissipation enhances the heat balance of the heat-generating components and avoids excessive local temperature, thereby achieving efficient heat dissipation of the motor pump.

DESCRIPTION OF EMBODIMENTS

In order to make the object, the technical solution and the advantage of the present invention more clear, the present invention will be described in detail with reference to the drawings and specific embodiments below.

It should also be noted that, in order to avoid obscuring the invention due to unnecessary details, only the structures and/or processing steps closely related to the present invention are shown in the drawings, and other details that have little relation with the present invention are omitted.

In addition, it should be noted that the terms "comprising", "including", or any other variants are intended to encompass a non-exclusive inclusion, so that a process, a method, an article, or a device that comprises a plurality of elements includes not only those elements but also other elements that are not explicitly listed, or elements that are inherent to such a process, method, item, or device.

Figure 1:
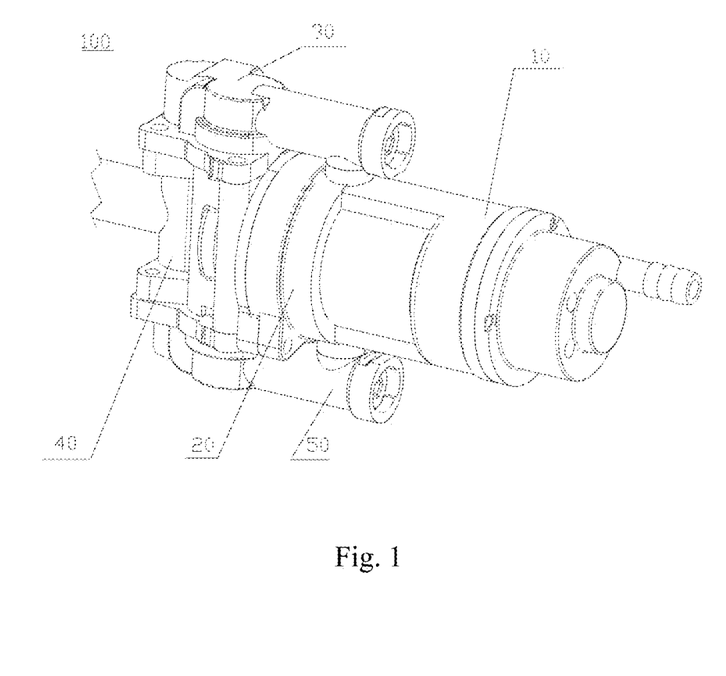
FIG. 1 is a perspective view of the high-pressure pump of the present invention.
Figure 2:
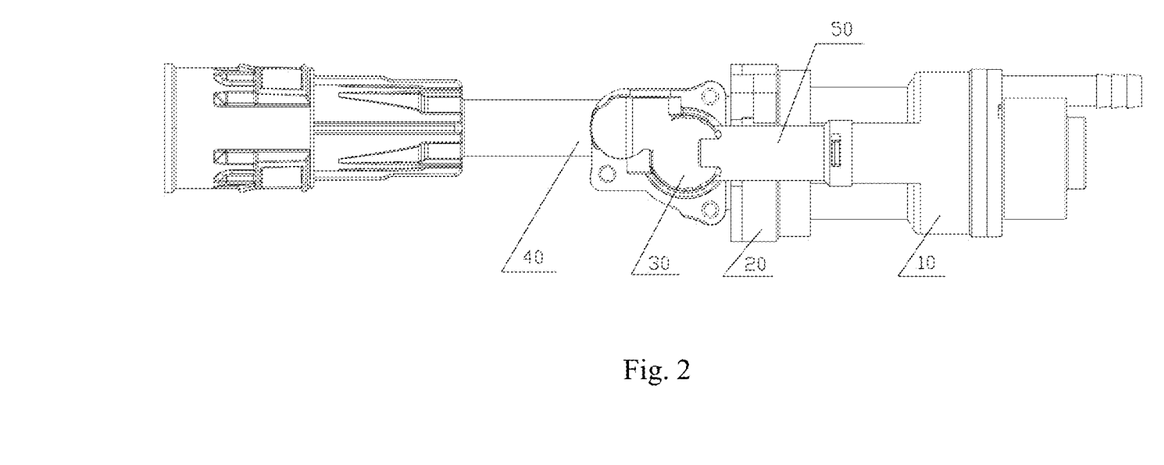
FIG. 2 is a top plan view of the high-pressure pump of the present invention.
Figure 3:
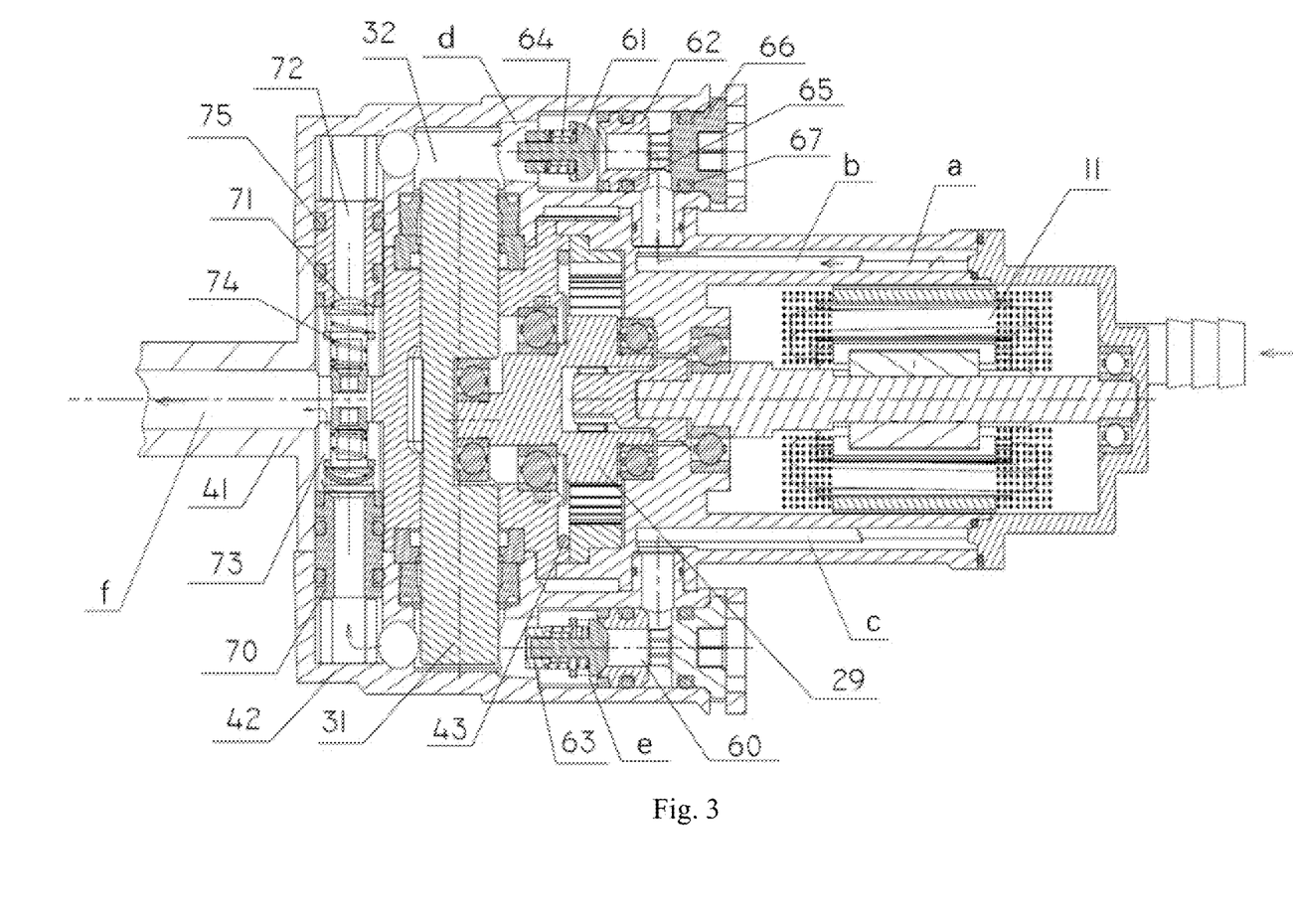
FIG. 3 is a cross-sectional view of the high-pressure pump of the present invention.

As shown in FIGS. 1 to 3, the high-pressure pump 100 of the present invention is a lithium battery driven, brushless, water-cooled and double plunger chamber high-pressure pump. The high-pressure pump 100 includes a motor assembly 10, a gear assembly 20, a plunger assembly 30, a pump head assembly 40, and an inlet and outlet valve assembly 50. The motor assembly 10 provides the motor shaft 111 with rotation speed and torque, and the speed is decelerated by the gear assembly 20, the eccentric shaft 29 is driven to rotate to push the plunger 31 to reciprocate. The plunger chamber 32 at both ends of the plunger 31 alternately absorbs water and drains, and a high pressure is generated in the passage f of the pump head assembly 40.

Figure 4:
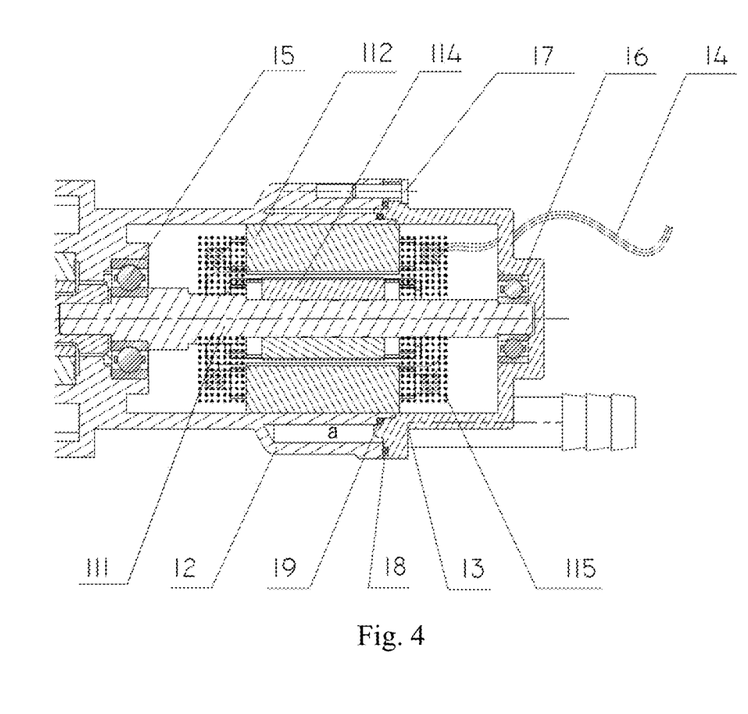
FIG. 4 is a cross-sectional view of another angle of the motor assembly of the high-pressure pump of the present invention.
Figure 5:
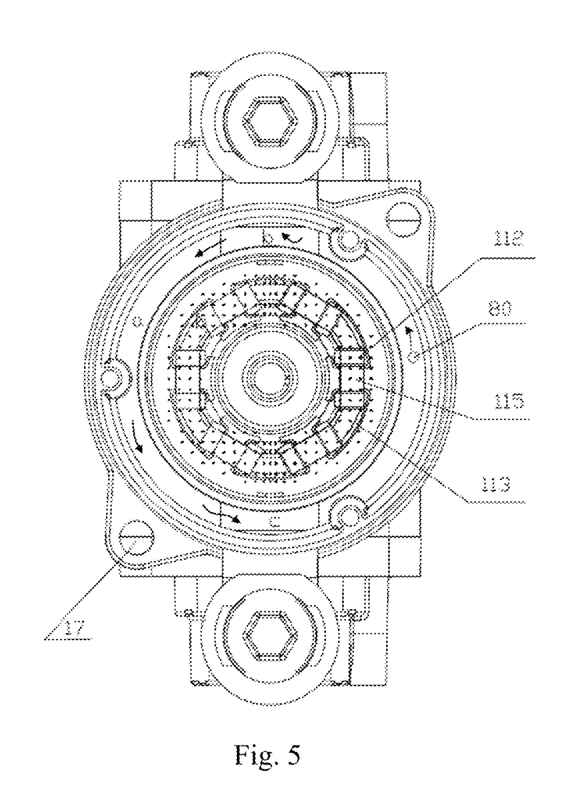
FIG. 5 is a right side view of the motor assembly with the motor cover removed, according to an embodiment of the present invention.

Referring to FIGS. 3 to 5, the motor assembly 10 includes a DC brushless motor 11, a double-layer housing 12, a motor cover 13, and a cable 14. The DC brushless motor 11 includes a motor shaft 111, a motor stator 112, a motor stator coil 113, and a rotor 114. Bearings 15, 16 are provided at both ends of the motor shaft 111. The double-layer housing 12 and the motor cover 13 are fastened together by screws 17, and the outer sealing ring 18 and the inner sealing ring 19 provide a sealing between the double-layer housing 12 and the motor cover 13.

The double-layer housing 12 is provided with an annular water channel a surrounding the motor stator 112, and the extended length of the annular water channel a in the axial direction of the high-pressure pump 100 is substantially equivalent to the axial length of the motor stator 112. The annular water channel a cools the motor stator 112. The motor stator coil 113 is surrounded by a heat-conductive material 115, and the heat-conductive material 115 conducts the heat of the motor stator coil 113 to the annular water channel a. Specifically, the heat-conductive material 115 is annularly filled at both ends of the motor stator 112 along the axial direction, that is, between the exposed motor stator coils 113. The heat-conductive material is preferably a heat dissipating silica gel which is filled between the motor stator coils 113 by means of potting. The length of the annular water channel a is substantially equivalent to that of the side surface of the motor stator 112, and the heat-conductive material 115 is distributed in a region corresponding to both end faces of the motor stator 112. The annular water channel a and the heat-conductive material 115 together form a heat radiating region corresponding to the outer surface of the motor stator 112.

The water inlet 80 is disposed at the rear end of the motor assembly 10, and the annular water channel a communicates with the water inlet 80 at an intermediate portion of the double-layer housing 12. The double-layer housing 12 further includes a first water channel b and a second water channel c which communicate with the annular water channel a and extend in the axial direction of the high-pressure pump. The first channel b and the second channel c extend to the sidewall of the gear assembly 20. The first water channel b and the second water channel c are both straight-through type and respectively located at the top and bottom of the double-layer housing 12, and the first water channel b and the second water channel c respectively communicate with the water inlet valve assembly 60 at both ends of the plunger assembly 30. The water channels d, e of the water valve assembly 60 are parallel to the first water channel b and the second water channel c and further communicate with the plunger chamber 32, and the plunger chamber 32 is perpendicular to the first water channel b and the second water channel c.

Figure 6:
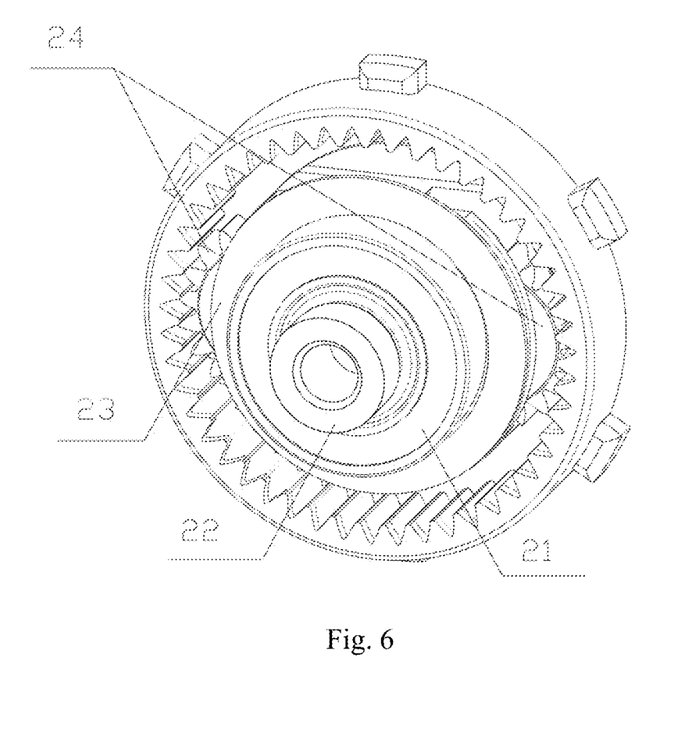
FIG. 6 is a perspective view of the gear assembly of the high-pressure pump of the present invention.
Figure 7:
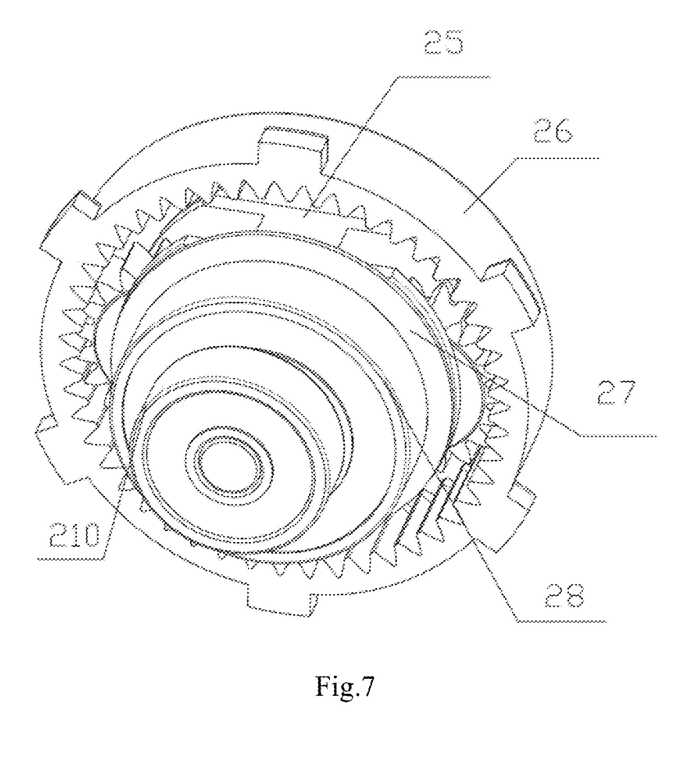
FIG. 7 is a perspective view of another angle of the gear assembly of the high-pressure pump of the present invention.

Referring to FIGS. 3, 6 and 7, the gear assembly 20 includes a first bearing 21, a central sun gear 22, a circlip stop 23, a planet gear 24, a planet gear holder 25, an outer ring gear 26, a circlip baffle 27, a second bearing 28, an eccentric shaft 29 and a third bearing 210. The central sun gear 22, the planet gear 24, and the outer ring gear 26 are rotatable relative to each other to achieve deceleration. The gear assembly 20 decelerates the rotational speed and torque from the motor assembly 20 to drive the eccentric shaft 29 to rotate.

Figure 8:
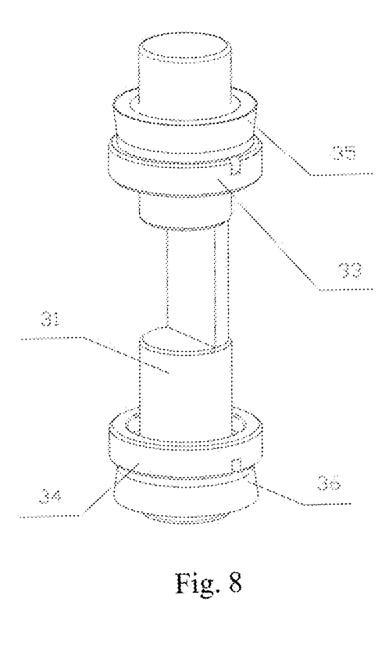
FIG. 8 is a perspective view of the plunger assembly of the high-pressure pump of the present invention.

Referring to FIGS. 3 and 8, the plunger assembly 30 includes a plunger 31, a pair of support rings 33, 34 and a pair of water seals 35, 36. The pump head assembly 40 includes a pump body 41 and a pump cover 42. The pump body 41 and the pump cover 42 are fastened by a plurality of screws. The pump head assembly 40 is also provided with a plurality of sealing rings 43 to ensure the sealing of the water channel. The inlet and outlet valve assembly 50 includes a water inlet valve assembly 60 and a water outlet valve assembly 70. The water inlet valve assembly 60 includes a valve body 61, a valve seat 62, a valve cover 63, a spring 64, a sealing ring 65, a water inlet valve plug 66, and a water inlet valve sealing ring 67. The outlet valve assembly 70 includes a valve body 71, a valve seat 72, a valve cover 73, a spring 74, and a plurality of sealing rings 75.

Referring to FIG. 3 and FIG. 5, the water channel of the high-pressure pump 100 of the present invention is as follows: the water channel begins from the water inlet 80 located on the motor tail, one water passage being to enter the first water channel b from the annular water channel a, and the other water passage being to enter the second water channel c relative to the first water channel b from the annular water channel a. The first water channel b and the second water channel c are respectively connected to the water inlet valve assemblies 60 at both ends of the plunger 31. When the plunger 31 reciprocates, the plunger chamber 32 on the side of the first water channel b increases in volume and absorb water, and the water inlet check valve on the side of the first water channel b overcomes the spring force, so the valve body 61 opens and the water flows from the first water channel b into the plunger chamber 32 through the check valve. At the same time, the volume of the plunger chamber 32 on the side of the second channel c decreases, the inlet check valve in the plunger chamber 32 closes, and the plunger water flow on the side of the second channel c overcomes the spring force of the water outlet check valve and opens the valve body 71 of the water outlet check valve. The water enters the high pressure passage f. The plunger 31 reciprocates, and the water in the first water channel b and the second water channel c alternately enters the plunger chamber 32 and the high pressure passage f. The annular water channel a, the first water channel b, and the second water channel c form flowing water while providing heat dissipation for the motor and the gear assembly.

The invention relates to a water-cooling and silica gel cooling mixed high-pressure pump 100, which uses a DC brushless motor as power, with high working efficiency, small volume, strong power and high pressure. The lithium battery being used as an energy source, which does not require an external power supply, is very convenient to use. By potting the stator coil of the motor, an annular water channel is arranged around the stator silicon steel sheet of the motor to provide a heat dissipation source around the motor. When the motor is working, the heat of the stator coil of the motor is directly transmitted from the heat-conductive material to the water cooling channel by means of heat conduction, so an efficient heat dissipation is obtained. The first water channel b and the second water channel c extend to the circumferential side of the gear assembly 20, so that the water cooling channel communicates with the side wall of the gear box, takes away the working heat of the gear box, and continuously performs active heat dissipation on the gear box, which provides the gear of the gear box and grease with a stable lower operating temperature.

Meanwhile, the active cooling method of water-cooling and silica gel mixing is adopted to strengthen the heat balance of the heat-generating components and avoid the local temperature being too high. The machine does not need the ventilation slot structure, so the running stability of the motor and the safety of the whole machine are obtained. The direct connection from the water inlet to the plunger chamber provides a short passage for the smooth flow of water into the plunger, and the components on the channel are compact.

The above embodiments are only used to illustrate the technical solutions of the present invention and are not limited thereto. Although the present invention is described in detail with reference to the preferred embodiments, those skilled in the art should understand that the technical solutions of the present invention may be modified or equivalently substituted without departing from the spirit and scope of the technical solutions of the present invention.

The invention claimed is:

1. A high-pressure pump, comprising a motor assembly including a motor shaft, a gear assembly, a plunger assembly including a plunger mounted in a plunger chamber, a pump head assembly, and an inlet and outlet valve assembly, wherein the motor assembly includes a motor and a double-layer housing and further including a motor stator that generates heat during operation, the motor stator including a plurality of motor stator coils, the double-layer housing forming an annular water channel surrounding the motor stator, a periphery of the plurality of motor stator coils being filled with heat-conductive material which is used to conduct the heat of the motor stator coil of the motor to the annular water channel;

wherein said motor stator further comprises a stator shaft and said heat-conductive material is annular-shaped and is disposed between exposed coils of the plurality of motor stator coils;

wherein said housing is provided with a first water channel and a second water channel which communicate with the annular water channel and extend in an axial direction of the stator shaft, said first water channel and said second water channel extending to a side wall of the gear assembly;

wherein the first water channel and the second water channel are located at a top and bottom of the double-layer housing, and the first water channel and the second water channel respectively communicate with first and second inlet check valves located at respective first and second ends the plunger assembly, and a plurality of water passages of the first and second inlet check valves are parallel to the first water channel and the second water channel and further communicate with the plunger chamber, the plunger chamber being vertically oriented with the first water channel and the second water channel;

wherein a tail end of the motor assembly is provided with a water inlet in an intermediate portion of the double-layer housing, and the annular water channel is connected to the water inlet; and, wherein a water passage is directly connected from the water inlet to the plunger chamber.

2. The high-pressure pump according to claim 1, wherein a length of said annular water channel is substantially equivalent to a length of a side surface of the motor stator, said heat-conductive material is distributed in a region corresponding to first and second end faces of the motor stator, said annular water channel and said heat-conductive material together form a heat dissipation area corresponding to an outer surface of the motor stator.

3. The high-pressure pump according to claim 1, wherein the heat-conductive material is a heat-dissipating silica gel which is filled into the motor stator coil by potting.

4. The high-pressure pump according to claim 1, wherein said motor assembly provides a rotational speed and torque of the motor shaft, the speed is decelerated by the gear assembly, an eccentric shaft is rotated to push the plunger to reciprocate, the plunger chamber at respective ends of the plunger alternately absorb water and drain to create a high pressure within the pump head assembly.

5. The high-pressure pump according to claim 1, wherein said motor is a DC brushless motor driven by a lithium battery.

* * * * *